March 23, 1965   E. P. WORTHEN ETAL   3,174,914
TANDEM FLASH DISTILLING PLANT
Filed Jan. 19, 1959   2 Sheets-Sheet 1
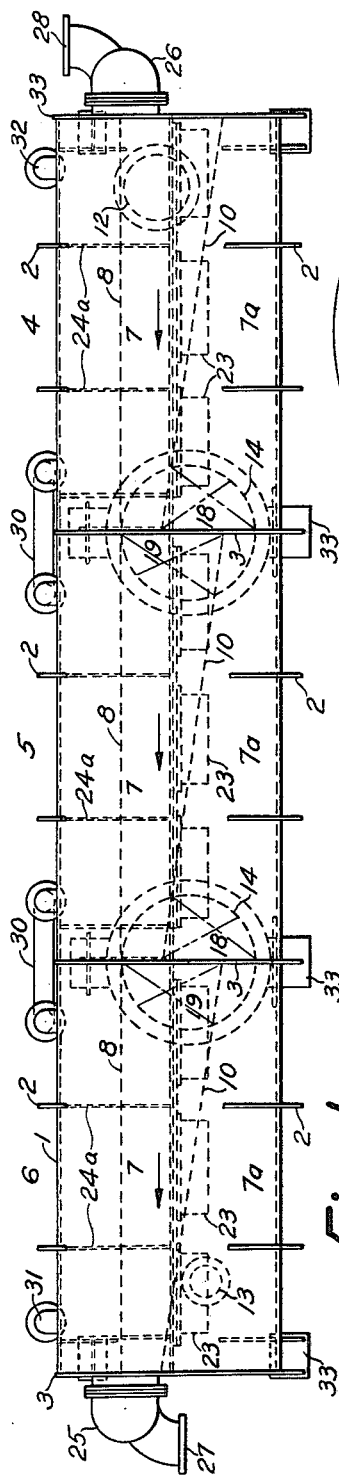
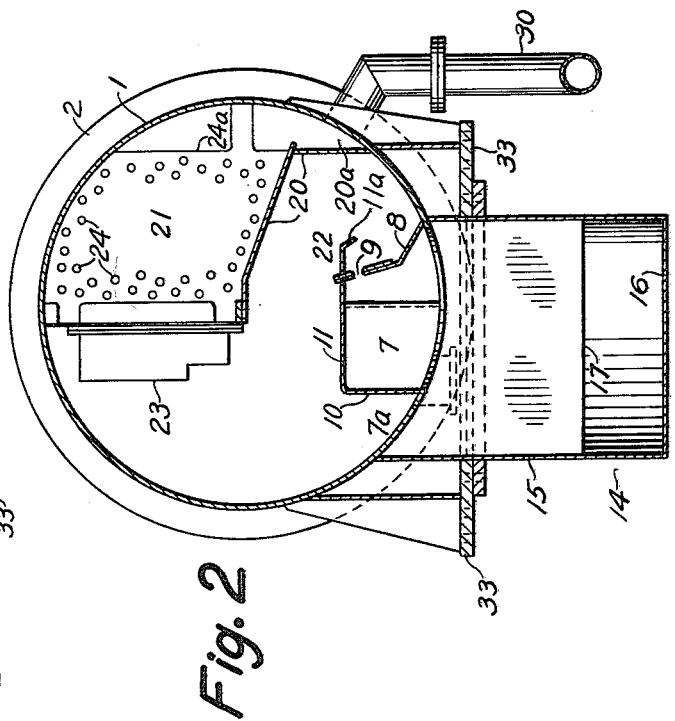
INVENTORS
Eugene Porter Worthen
Fenner Smith Barbour
BY Natt M Emery Jr.
ATTORNEY

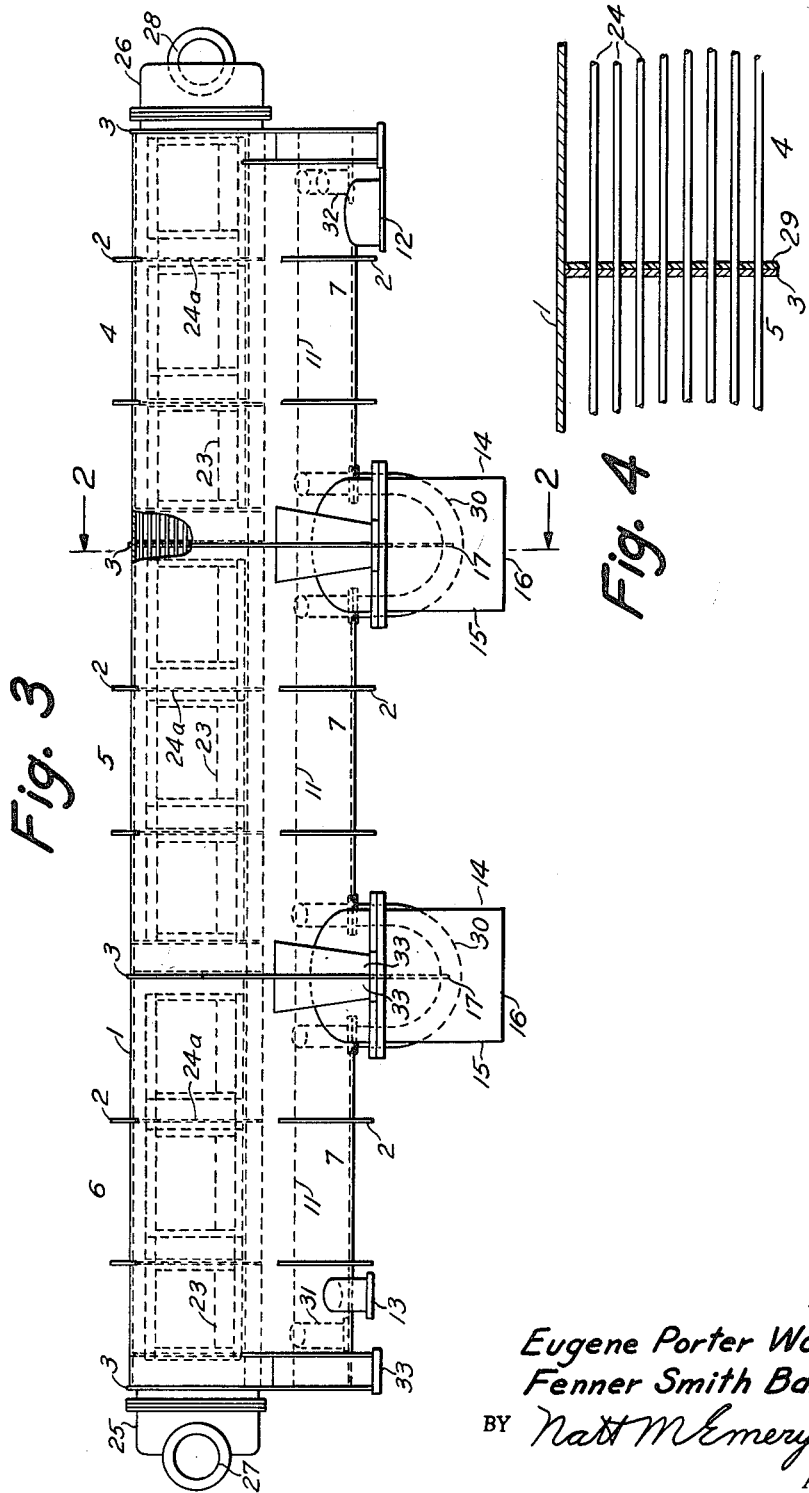

United States Patent Office 3,174,914
Patented Mar. 23, 1965

3,174,914
TANDEM FLASH DISTILLING PLANT
Eugene Porter Worthen, Braintree, and Fenner Smith Barbour, Wollaston, Mass., assignors to Bethlehem Steel Company, a corporation of Pennsylvania
Filed Jan. 19, 1959, Ser. No. 787,418
15 Claims. (Cl. 202—173)

This invention relates to flash distilling plants in general and, in particular, to a novel flash distilling plant comprising a plurality of stages mounted in end-to-end relationship in one continuous shell.

The conventional flash distilling unit with two or more stages of distillation is so constructed that each stage is entirely independent of the others although two or more stages may be incorporated in a single shell. The coolant passing through the stage condenser, usually a multi-pass unit, of one stage is required to be piped to the stage condenser of the next stage. Excess feed water which does not flash in one stage requires piping to the next stage in the case of separate shells or, in the case of a plurality of stages mounted in a single shell, ducting is required.

The flash distilling plant which is the subject of this application comprises a plurality of stages mounted in end-to-end relationship in a single continuous shell. Condensing means for the flashed vapors of each stage are provided by a number of tubes continuous throughout the length of the shell and passing through the partition walls separating adjacent stages. Novel tapered feed ducts are provided so that at any point along the longitudinal dimension of a stage adequate cross-sectional flow area is assured for the feed to be flashed as well as for the excess feed of the particular stage.

Accordingly, one of the objects of our invention is to provide a novel flash distilling plant comprising a plurality of stages mounted in end-to-end relationship in a single continuous shell.

It is also an object of our invention to provide in such a flash distilling plant novel condenser means comprising tubes continuous throughout the length of the shell and passing through the partition walls between stages.

It is another object of our invention to provide in such a flash distilling plant novel tapered duct means to assure, at any point along the longitudinal dimension of a stage, adequate flow area for the feed to be flashed as well as for the excess feed of the particular stage.

It is a further object of this invention to reduce the pressure drop in and between each stage of flash distillation whereby with a given feed water temperature a greater number of stages of flash distillation is economically feasible.

It is still another object of this invention to provide a flash distilling plant comprising a plurality of stages wherein the number of water chests and amount of piping has been reduced to a minimum.

It is still a further object of this invention to provide a flash distilling plant wherein power requirements for pumping are minimized.

Other and further objects of this invention will become apparent during the course of the following description.

Referring now to the accompanying drawings, in which like numerals represent like parts in the several views:

FIGURE 1 represents a view in plan of our flash distilling plant, showing the shell with three stages of flash distillation therein in end-to-end relationship.

FIGURE 2 represents a section in elevation taken along the line 2—2 of FIGURE 3.

FIGURE 3 represents a view in elevation of the flash distilling plant, partly broken away to show the condenser tubes passing through a partition wall between stages.

FIGURE 4 represents an enlarged detail of the condenser tubes passing through the partition wall between stages showing one method of sealing the spaces around the tubes.

The flash distilling plant is seen to comprise shell 1, suitably stiffened by means of rings 2, with partition walls 3 provided therein and defining stages 4, 5 and 6. While only one plural-stage shell is shown, it will be understood that, in any particular installation, one or several such plural-stage shells may be used, as hereinafter described, depending upon the economic factors of the particular installation. It will be further understood that, while we have shown a three-stage shell, this invention is not limited to such number, but shells having more or less than the three stages shown are contemplated as being within the scope of our invention, the exact number of stages in a shell depending upon the economics of the particular application.

That end of each stage at which the heated feed enters for flash evaporation therein will be termed the "front" of such stage, and the opposite end of said stage will be termed the "rear." As a frame of reference, arrows are shown in FIGURE 1 to indicate the flow of heated feed from "front" to "rear."

Tapered feed ducts 7, arranged at the bottoms of each of the stages 4, 5 and 6, each comprise wall 8 provided with a plurality of longitudinally spaced orifices 9, wall 10 and top plate 11 formed as part of, or secured to, wall 10. As will be evident upon examination of FIGURE 1, wall 10 is arranged at an angle to wall 8, so that the area bounded by walls 8 and 10 and shell 1, under top plate 11, decreases from the front to the rear of any stage. It will also be evident, upon examination of the same view, that the space on the other side of wall 10, which will be termed excess feed channel 7a, increases from the front to the rear of any stage complementary to feed duct 7.

In multistage flash distillation, heated feed is flashed off in successive stages of increasing vacuum (or decreasing pressure). In the plant shown in FIGURES 1–4, stage 4 is at a higher pressure than stage 5, and the latter is at a higher pressure than stage 6, the necessary vacua in the several stages being supplied by conventional means such as the well-known air-ejector, which means are not shown or further described herein as otherwise this specification would be unnecessarily lengthened.

The flash distilling plant is provided with feed inlet 12 communicating with feed duct 7 of stage 4, and with excess feed outlet 13 communicating with excess feed channel 7a of stage 6.

Loop seal and transfer pot 14, comprising cylindrical section 15, bottom plate 16 and wall 17, is mounted to shell 1 between two adjacent stages of the flash distilling plant. Excess feed water of any stage collects in the excess feed channel 7a, flows through opening 18 in shell 1 down one side of loop seal and transfer pot 14, under wall 17 and up the other side thereof and thence through opening 19 of shell 1 into the feed duct 7 of the next stage. The two columns of feed in the pot 14 assist in maintaining the pressure differential between stages.

Wrapper plate 20, continuous between the two partition walls 3 defining the ends of a stage, separates the condenser section 21 from the flash section 22 of the flash distilling plant, except for communication through vapor separators 23. Tubes 24 of condenser section 21 extend through all partition walls 3 of all stages in one shell of the flash distilling plant, suitably supported in each stage by means of tube sheets 24a, and communicate with water chests 25 and 26, the latter being provided with water inlet 27 and water outlet 28 respectively. Where the tubes 24 pass through a partition wall 3, we provide sealing means to prevent vapor leakage between stages. We have shown one such sealing means in FIGURE 4 as comprising a sheet 29 of rubber-like material with holes drilled therein registering with, and slightly smaller than, the holes in partition wall 3. We prefer to place this sheet 29 on the high-pressure side of partition wall 3 so that the pressure acts to force the same against partition wall 3 spreading the same against tubes 24 to maintain the seal. Sheet 29 may, of course, be placed on the low-pressure side of partition wall 3 in which case it would be held in place under pressure from a support or retaining plate (not shown) drilled in a like manner and secured for example to partition wall 3. We may also use other methods and apparatus to seal the annular openings between tubes 24 and partition wall 3. For instance, the tubes 24 could be lightly expanded to contact the metal of partition wall 3, thus assuring a tight seal to maintain the pressure difference between stages. We may, if desired, use O rings of rubber-like material inserted in grooves in partition wall 3 and engaging tubes 24. We may also utilize any other suitable sealing device not specifically mentioned herein.

As shown in the drawings, we prefer condenser section 21 to be of the "single-pass" type.

Distillate collects on wrapper plate 20, flowing down into the space between the lower leg of said wrapper plate 20 and shell 1, which space will be termed distillate channel 20a and is passed on to the distillate channel 20a of the next stage by means of distillate loop seal 30, the latter also serving to maintain the pressure differential between stages. We may also provide distillate channel 20a by extending wrapper plate 20 to shell 1. In the last stage 6 of the flash distilling plant shown, distillate is withdrawn from distillate channel 20a through outlet 31 to storage or, where several plural-stage shells 1 constitute the flash distilling plant, the distillate may be piped from outlet 31 to an inlet communicating with the distillate channel of the next stage in the next succeeding shell. Similarly, where the shell 1 shown in the drawings is not the first of several plural-stage shells, the distillate from the distillate channel of the last stage of the preceding shell may be introduced into inlet 32 communicating with the distillate channel 20a of the first stage of the shell 1 of the drawings, viz. into stage 4.

The operation of a flash distilling plant consisting of a single plural-stage shell as shown in the drawings will now be described.

Feed water enters the first stage, viz. stage 4, of shell 1 through inlet 12 and passes along feed duct 7. Orifices 9 in wall 8 of the feed duct 7 release the feed from the duct to flash section 22 where a portion of the feed flashes to vapor, the unflashed portion of said feed being termed "excess" feed, i.e., such unflashed feed is in excess in respect to that particular stage of the flash distilling plant. The cross-sectional area of feed duct 7 decreases from the front to the rear of the stage, preferably in proportion to the decrease, from the front to the rear of the stage, in the volume of feed water flowing in the feed duct 7, said decrease corresponding to the amount of feed water that has already passed through orifices 9. In other words, feed duct 7 has its greatest cross-sectional area at the front of the stage, and this area is reduced as the duct 7 approaches the rear of the stage.

The mixture of flashed vapor and excess feed impinges on deflecting means 11a as shown in FIG. 2 producing a curtain-like spray of liquid feed through which the vapor passes and loses some of its entrained fog. The mixture then passes through the arc-like path formed by walls 20, producing a second curtain-like spray through which the vapor passes to remove additional fog. The vapor then passes upwardly through vapor separators 23 and thence across tubes 24 in condenser section 21. The excess feed collects in the excess feed channel 7a, and flows toward pot 14.

The tapered feed duct 7 has its greatest area where the volume of feed is the greatest, i.e., at the front of the stage, and the complementary area of the excess feed channel 7a is least where the volume of excess feed is least, and greatest where the volume of excess feed is greatest. This arrangement, besides making most efficient use of shell space, reduces the velocity of the excess feed entering pot 14, resulting in a low feed pressure drop between stages, which is most important in a multistage distilling plant.

The excess feed from stage 4 passes down one side of wall 17 of pot 14, and up the other side into feed duct 7 of stage 5.

Distillate from the condenser section 21 of stage 4 collects on wrapper plate 20, flows into distillate channel 20a, and is cascaded to the distillate channel 20a of stage 5 through loop seal 30.

The foregoing processes are repeated in stages 5 and 6, except that in the last stage excess feed is withdrawn from outlet 13 and is discharged, and distillate is withdrawn from outlet 31 and is sent to storage.

With respect to condenser section 21, coolant enters through inlet 27, passes through all stages through tubes 24, countercurrent to the direction of flow of feed water in feed ducts 7, and is removed through outlet 28. This coolant may be feed water going through the first steps of preheating. Thus, cool feed water enters inlet 27 and leaves at a higher temperature from outlet 28, and may then be further heated in a heat exchanger (not shown), and, when hot enough, may be introduced into inlet 12 whence it is brought through the aforementioned stages for the purpose of purification as has been described.

The operation in each shell of a flash distilling plant comprising a plurality of plural-stage shells is identical with the operation just described. Excess feed from outlet 13 of the last (lowest pressure) stage of the preceding shell enters inlet 12 of the first stage of the next shell (said first stage being at higher pressure than the other stages of the same shell and at lower pressure than the last stage of the preceding shell). Distillate from the distillate channel of the last stage of the preceding shell may, if desired, be cascaded from outlet 31 into inlet 32 communicating with distillate channel 20a of the first stage of the next shell. Coolant (preheated feed water being subjected to further preheating) is passed from outlet 28 of one shell to inlet 27 of the adjacent shell opposite to the direction of flow of feed water, so that through all of the stages of all of the shells the coolant in tubes 24 and the heated feed in feed ducts 7 travel countercurrent to each other.

Shell 1 may be supported in any suitable manner. While this is not a part of our invention, we show flanged brackets 33 which we prefer to use for this purpose.

Some of the advantages accruing from our design are as follows:

(1) Feed water pressure drop in and between the several stages is considerably reduced by the novel tapered feed ducts 7 and excess feed channels 7a, and by the novel loop seal and transfer pots 14, the ducts and pots permitting low feed velocities. Reduction of feed pressure drop in and between stages is most important in multistage plants, particularly when the temperature and pressure differences between stages are limited.

(2) Tapered feed ducts 7 and excess feed channels 7a, by making more efficient disposition of space, permit the use of smaller diameter shells than would otherwise be the case.

(3) The number of water chests is minimized. For example, the three stage shell shown in the drawings requires only two water chests. Conventionally three such stages would require 6 water chests.

(4) The required coolant pressure is reduced to a minimum as a result of our use of a single-pass condenser section 21 with tubes 24 extending in a straight-run through all stages, and as a result of our reduction of water chests and piping between stages. This arrangement reduces the required pumping power.

Although we have illustrated the best embodiment of our invention in some detail, we do not wish to be limited to the exact construction shown and described, but may use such substitutions, modifications or equivalents thereof as are embraced within the scope of our invention or as pointed out in the claims.

We claim:

1. A flash distilling plant comprising:
   (a) an elongated shell,
   (b) first and second walls arranged transversely of said shell and longitudinally spaced therein,
   (c) a stage within said shell defined by said shell and by said first and second walls,
   (d) an elongated feed duct within said stage and having a first end and a second end, said feed duct gradually increasing in transverse cross-sectional area from said first end to said second end thereof, said feed duct being adapted to release feed into the stage substantially along the length of said stage for flash evaporation therein,
   (e) feed inlet means communicating with the second end of said feed duct,
   (f) an elongated channel within said stage alongside said feed duct to collect unflashed feed and having a first end and a second end, said channel gradually increasing in transverse cross-sectional area from said second end to said first end thereof,
   (g) the first ends of said feed duct and said channel being adjacent each other and the second ends of said feed duct and said channel being adjacent each other,
   (h) outlet means for the discharge of unflashed feed from said stage communicating with the first end of said channel and extending outside said stage.

2. A flash distilling plant comprising:
   (a) an elongated shell,
   (b) first, second and third walls arranged transversely of said shell and longitudinally spaced therein,
   (c) a first stage within said shell defined by said shell and by said first and second walls,
   (d) a second stage within said shell defined by said shell and by said second and third walls,
   (e) first and second elongated feed ducts within said first and second stages respectively, said first and second feed ducts being adapted to release feed into said first duct and second stages respectively substantially along the lengths of said first and second stages respectively for flash evaporation therein, each of said feed ducts having a first end and a second end and gradually increasing in transverse cross-sectional area from said first end to said second end thereof,
   (f) first and second elongated channels within said first and second stages respectively alongside said first and second feed ducts respectively to collect unflashed feed, each of said channels having a first end and a second end and gradually increasing in transverse cross-sectional area from said second end to said first end thereof, the first ends of said first feed duct and first channel being adjacent each other and the second ends of said first feed duct and first channel being adjacent each other, the first ends of said second feed duct and second channel being adjacent each other and the second ends of said second feed duct and second channel being adjacent each other,
   (g) feed inlet means communicating with the second end of said first feed duct,
   (h) feed transfer means for the discharge of unflashed feed from said first stage and the introduction of said unflashed feed into said second stage, said feed transfer means communicating between the first end of said first channel and the second end of said second feed duct,
   (i) outlet means for the discharge of unflashed feed from said second stage communicating with the first end of said second channel and extending outside said second stage.

3. Apparatus as in claim 2, said feed transfer means comprising:
   (j) a second shell mounted to said elongated shell below said second wall, said second shell extending below said elongated shell,
   (k) means closing the bottom of said second shell,
   (l) a partition wall in said second shell extending from said elongated shell downwardly to a point above the bottom of said second shell,
   (m) first and second vertically extending passageways with said second shell on opposite sides of said partition wall,
   (n) said first passageway communicating at its upper end with the first end of said first channel,
   (o) said second passageway communicating at its upper end with the second end of said second duct,
   (p) said first and second passageways communicating at their lower ends with each other below the bottom of said partition wall.

4. A flash distilling plant comprising:
   (a) an elongated shell,
   (b) first, second and third walls arranged transversely of said shell and longitudinally spaced therein,
   (c) a first stage within said shell defined by said shell and by said first and second walls,
   (d) a second stage within said shell defined by said shell and by said second and third walls,
   (e) means producing a partial vacuum in said first and second stages, said partial vacuum in said second stage being greater than said partial vacuum in said first stage,
   (f) first and second elongated feed ducts within said first and second stages respectively and extending longitudinally of said elongated shell, said first and second feed ducts being adapted to release feed into said first and second stages respectively substantially along the lengths of said first and second stages respectively for flash evaporation therein, each of said feed ducts having a first end and a second end and gradually increasing in transverse cross-sectional area from said first end to said second end thereof, the first end of said first feed duct being adjacent said second wall and the first end of said second feed duct being adjacent said third wall,
   (g) first and second elongated channels within said first and second stages respectively extending longitudinally of said elongated shell alongside said first and second feed ducts respectively to collect unflashed feed, each of said channels having a first end and a second end and gradually increasing in transverse cross-sectional area from said second end to said first end thereof, the second end of said first channel being adjacent said first wall and the second end of said second channel being adjacent said second wall, the first ends of said first feed duct and first channel being adjacent each other and the second ends of said first feed duct and first channel being adjacent each other, the first ends of said second feed duct and second channel being adjacent each other and the second ends of said second feed duct and second channel being adjacent each other,
   (h) feed inlet means communicating with the second end of said first feed duct,
   (i) feed transfer means for the discharge of unflashed feed from said first stage and the introduction of said unflashed feed into said second stage, said feed transfer means communicating between the first end of said first channel and the second end of said second feed duct,
   (j) outlet means for the discharge of unflashed feed from said second stage communicating with the first end of said second channel and extending outside said second stage.

5. Apparatus as in claim 4, said feed transfer means comprising:
(k) a second shell mounted to said elongated shell below said second wall, said second shell extending below said elongated shell,
(l) means closing the bottom of said second shell,
(m) a partition wall in said second shell extending from said elongated shell downwardly to a point above the bottom of said second shell,
(n) first and second vertically extending passageways within said second shell on opposite sides of said partition wall,
(o) said first passageway communicating at its upper end with the first end of said first channel,
(p) said second passageway communicating at its upper end with the second end of said second duct,
(q) said first and second passageways communicating at their lower ends with each other below the bottom of said partition wall.

6. A flash distilling plant comprising:
(a) an elongated shell having a first end and a second end,
(b) first, second and third walls arranged transversely of said elongated shell and longitudinally spaced therein,
(c) a first stage within said elongated shell defined by said elongated shell and by said first and second walls,
(d) a second stage within said elongated shell defined by said elongated shell and by said second and third walls,
(e) first and second elongated feed ducts within said first and second stages respectively and extending longitudinally of said elongated shell, said first and second feed ducts being adapted to release feed into said first and second stages respectively substantially along the lengths of said first and second stages respectively for flash evaporation therein, each of said feed ducts having a first end and a second end and gradually increasing in transverse cross-sectional area from said first end to said second end thereof, the second ends of said feed ducts all facing toward the second end of said elongated shell,
(f) first and second elongated channels within said first and second stages respectively extending longitudinally of said elongated shell alongside said first and second feed ducts respectively to collect unflashed feed, each of said channels having a first end and a second end and gradually increasing in transverse cross-sectional area from said second end to said first end thereof, the first ends of said channels all facing toward the first end of said elongated shell, the first ends of said first feed duct and first channel being adjacent each other and the second ends of said first feed duct and first channel being adjacent each other, the first ends of said second feed duct and second channel being adjacent each other and the second ends of said second feed duct and second channel being adjacent each other,
(g) feed inlet means communicating with the second end of said first feed duct,
(h) a second shell mounted to said elongated shell below said second wall, said second shell extending below said elongated shell,
(i) means closing the bottom of said second shell,
(j) a partition wall in said second shell in the same vertical plane as said second wall, said partition wall extending from said elongated shell downwardly to a point above the bottom of said second shell,
(k) first and second vertically extending passageways within said second shell on opposite sides of said partition wall,
(l) said first passageway communicating at its upper end with the first end of said first channel,
(m) said second passageway communicating at its upper end with the second end of said second duct,
(n) said first and second passageways communicating at their lower ends with each other below the bottom of said partition walls,
(o) outlet means for the discharge of unflashed feed from said second stage communicating with the first end of said second channel and extending outside said second stage.

7. A flash distilling plant comprising:
(a) an elongated shell,
(b) first, second and third walls arranged transversely of said shell and longitudinally spaced therein,
(c) a first stage within said elongated shell defined by said elongated shell and by said first and second walls,
(d) a second stage within said elongated shell defined by said elongated shell and by said second and third walls,
(e) first and second elongated feed ducts within said first and second stages respectively, said first and second feed ducts being adapted to release feed into said first and second stages respectively substantially along the lengths of said first and second stages respectively for flash evaporation therein, each of said feed ducts having a first end and a second end and gradually increasing in transverse cross-sectional area from said first end to said second end thereof,
(f) feed inlet means communicating with the second end of said first feed duct,
(g) an elongated channel within said first stage alongside said first feed duct to collect unflashed feed and having a first end and a second end, said channel gradually increasing in transverse cross-sectional area from said second end to said first end thereof, the first ends of said first feed duct and said channel being adjacent each other and the second ends of said first feed duct and said channel being adjacent each other,
(h) feed transfer means for the discharge of unflashed feed from said first stage and the introduction of said unflashed feed into said second stage, said feed transfer means communicating between the first end of said channel and the second end of said second feed duct.

8. Apparatus as in claim 7, said feed transfer means comprising:
(i) a second shell mounted to said elongated shell below said second wall, said second shell extending below said elongated shell,
(j) means closing the bottom of said second shell,
(k) a partition wall in said second shell extending from said elongated shell downwardly to a point above the bottom of said second shell,
(l) first and second vertically extending passageways within said second shell on opposite sides of said partition wall,
(m) said first passageway communicating at its upper end through a first opening in the elongated shell with the first end of said first channel,
(n) said second passageway communicating at its upper end through a second opening in the elongated shell with the second end of said second duct,
(o) said first and second passageways communicating at their lower ends with each other below the bottom of said partition wall.

9. Apparatus as in claim 8, further including:
(p) said first and second openings in the elongated shell being substantially equal in area.

10. Apparatus as in claim 8, further comprising:
(p) said first and second openings in the elongated shell being substantially equal in area,
(q) the combined area of said first and second openings in said elongated shell being equal to a major portion of the horizontal cross-sectional area of said second shell.

11. Apparatus as in claim 7, further comprising:
(i) condenser tube means in said elongated shell extending longitudinally thereof in a straight continuous run through said first and second stages in heat-exchange relation with said first and second stages.

12. Apparatus as in claim 7, further comprising:
(i) condenser tube means in said elongated shell extending longitudinally thereof in a straight continuous run through said first, second and third walls,
(j) that portion of said condenser tube means lying between said first and second walls being in heat-exchange relation with said first stage,
(k) that portion of said condenser tube means lying between said second and third walls being in heat-exchange relation with said second stage.

13. A flash distilling plant comprising:
(a) a horizontally elongated cylindrical shell,
(b) first and second wall longitudinally spaced in said shell,
(c) a stage within said shell defined by said shell and by said first and second walls,
(d) a third wall in said stage extending between said first and second walls, said third wall being substantially vertical and angularly displaced with respect to a vertical plane through the longitudinal axis of said shell, said third wall having a first side and a second side opposite said first side,
(e) an elongated feed duct within said stage bounded along one side by the first side of said third wall and adapted to release feed into the stage substantially along the length of said stage for flash evaporation therein, one end of said feed duct being wider than the other end thereof,
(f) feed inlet means communicating with the wider end of said feed duct,
(g) an elongated channel within said stage bounded along one side by the second side of said third wall to collect unflashed feed, one end of said channel being wider than the other end thereof,
(h) outlet means for the discharge of unflashed feed from said stage communicating with the wider end of said channel and extending outside said stage.

14. A flash distilling plant comprising:
(a) a horizontally elongated cylindrical shell,
(b) first, second and third walls longitudinally spaced in said shell,
(c) a first stage within said shell defined by said shell and by said first and second walls,
(d) a second stage within said shell defined by said shell and by said second and third walls,
(e) a fourth wall in said first stage extending between said first and second walls, said fourth wall being substantially vertical and angularly displaced with respect to a vertical plane through the longitudinal axis of said shell, said fourth wall having a first side and a second side opposite said first side,
(f) a fifth wall in said second stage extending between said second and third walls, said fifth wall being substantially vertical and angularly displaced with respect to a vertical plane through the longitudinal axis of said shell, said fifth wall having a first side and a second side,
(g) first and second elongated feed ducts within said first and second stages respectively bounded along one side by the first side of said fourth and fifth walls respectively and adapted to release feed into said first and second stages respectively substantially along the lengths of the said first and second stages respectively for flash evaporation therein, one end of each of said first and second feed ducts being wider than the other end thereof,
(h) first and second elongated channels within said first and second stages respectively bounded along one side by the second side of said fourth and fifth walls respectively to collect unflashed feed from said first and second stages respectively, one end of each of said first and second channels being wider than the other end thereof,
(i) feed inlet means communicating with the wider end of said first feed duct,
(j) feed transfer means for the discharge of unflashed feed from said first stage and the introduction of said unflashed feed into said second stage, said feed transfer means communicating between the wider end of said first channel and the wider end of said second feed duct,
(k) outlet means for the discharge of unflashed feed from said second stage communicating with the wider end of said second channel and extending outside said second stage.

15. A flash distilling plant comprising:
(a) a horizontally elongated cylindrical shell,
(b) first, second and third walls longitudinally spaced in said shell,
(c) a first stage within said shell defined by said shell and by said first and second walls,
(d) a second stage within said shell defined by said shell and by said second and third walls,
(e) a fourth wall in said first stage extending between said first and second walls, said fourth wall being substantially vertical and angularly displaced with respect to a vertical plane through the longitudinal axis of said shell, said fourth wall having a first side and a second side opposite said first side,
(f) a fifth wall in said second stage extending between said second and third walls, said fifth wall being substantially vertical and angularly displaced with respect to a vertical plane through the longitudinal aixs of said shell, said fifth wall having a first side,
(g) first and second elongated feed ducts within said first and second stages respectively bounded along one side by the first side of said fourth and fifth walls respectively and adapted to release feed into said first and second stages respectively substantially along the lengths of said first and second stages respectively for flash evaporation therein, one end of each of said first and second feed ducts being wider than the other end thereof,
(h) feed inlet means communicating with the wider end of said first feed duct,
(i) an elongated channel within said first stage bounded along one side by the second side of said fourth wall to collect unflashed feed from said first stage, one end of said channel being wider than the other end thereof,
(j) feed transfer means for the discharge of unflashed feed from said first stage and the introduction of said unflashed feed into said second stage, said feed transfer means communicating between the wider end of said channel and the wider end of said second feed duct.

References Cited in the file of this patent

UNITED STATES PATENTS

| 11,883 | Sewell | Oct. 31, 1854 |
| 2,165,044 | Fox et al. | July 4, 1939 |
| 2,368,588 | Worthen et al. | Jan. 30, 1945 |
| 2,398,068 | Worthen et al. | Apr. 9, 1946 |
| 2,613,177 | Worthen et al. | Oct. 7, 1952 |
| 2,759,882 | Worthen et al. | Aug. 21, 1956 |
| 2,869,436 | Stewart | Jan. 20, 1959 |
| 2,934,477 | Siegfried | Apr. 26, 1960 |
| 3,096,256 | Worthen et al. | July 2, 1963 |

FOREIGN PATENTS

| 3,326 | Great Britain | 1886 |
| 1,027,700 | Germany | Apr. 10, 1958 |
| 406,584 | Great Britain | Mar. 1, 1960 |

UNITED STATES PATENT OFFICE
CERTIFICATE OF CORRECTION

Patent No. 3,174,914                      March 23, 1965

Eugene Porter Worthen et al.

It is hereby certified that error appears in the above numbered patent requiring correction and that the said Letters Patent should read as corrected below.

Column 5, line 44, strike out "duct"; column 6, line 13, for "with" read -- within --.

Signed and sealed this 17th day of August 1965.

(SEAL)
Attest:

ERNEST W. SWIDER                      EDWARD J. BRENNER
Attesting Officer                       Commissioner of Patents